United States Patent [19]

Willner

[11] Patent Number: 5,044,783
[45] Date of Patent: Sep. 3, 1991

[54] POCKET SURFACE FOR SEPARATOR FOR BALL BEARINGS

[75] Inventor: Wilfried Willner, Grafenrheinfeld, Fed. Rep. of Germany

[73] Assignee: FAG Kugelfischer George Schafer (KGaA), Fed. Rep. of Germany

[21] Appl. No.: 484,393

[22] Filed: Feb. 23, 1990

[30] Foreign Application Priority Data

Nov. 29, 1989 [DE] Fed. Rep. of Germany ....... 3939438

[51] Int. Cl.$^5$ .............................................. F16C 33/38
[52] U.S. Cl. ................................... 384/523; 384/530
[58] Field of Search ............... 384/523, 530, 528, 533, 384/531

[56] References Cited

U.S. PATENT DOCUMENTS 2,590,939 4/1952 Cobb .
3,820,867 6/1974 Dickinson et al. .................. 384/530
4,886,379 12/1989 Bayer ................................... 384/523

Primary Examiner—Lenard A. Footland
Attorney, Agent, or Firm—Ostrolenk, Faber, Gerb & Soffen

[57] ABSTRACT

A separator or cage for ball bearings has a plurality of pockets. Each pocket has an internal pocket surface toward the ball. At each half of the pitch circle of the pocket around the ball there are two approximately cylindrical first surface sections which are spaced nearer to the ball, a respective spherically curved second pocket surface section which extends over the respective pole of the ball and which has a diameter smaller than the ball, and a respective third pocket surface section which extends over the equator of the ball at each circumferential end of the pocket and which has a larger diameter than the ball. The pocket surface provides good lubrication support for the ball to minimize rubbing of the ball against the separator pocket surface.

17 Claims, 2 Drawing Sheets

POCKET SURFACE FOR SEPARATOR FOR BALL BEARINGS

BACKGROUND OF THE INVENTION

The present invention relates to a separator or cage for ball bearings, the separator including pockets that are approximately adapted to the size of the ball in the pocket, and particularly pocket surfaces with a plurality of cylindrical regions.

A separator of this type is known from Federal Republic of Germany Published Application OS 36 40 633. In that case, the pocket sections have flat zones so that contact with the balls can take place only in those zones. The conditions of the contacts between the separator pockets and the balls are improved because small area contact zones are present only at given points. The narrowing slots which are circumferentially alongside the small area contact zones build up a hydrodynamic lubricating film which can support a smaller load since the load bearing lubricating wedges are relatively small. The pocket sections alongside the flat zones are equidistantly spaced from the balls and therefore do not form bearing surfaces. There are frequent contacts between the balls and the separator. This, in turn, substantially increases both the amount of noise developed and the friction. For instance, when such ball bearings are used in fixed disk spindles, the increase is to such an extent that errors can occur in the writing and reading of the data.

SUMMARY OF THE INVENTION

The object of the invention is to improve the above type of separator to avoid the above described disadvantages and, in particular, to provide a low noise and low friction bearing having optimal operating qualities.

A separator or a cage for ball bearings, which separator is designed according to the invention, defines a respective pocket for each of the balls. With respect to its rotation, each ball has opposite poles along the axis of spin and an equator which is in a plane perpendicular to the spin axis and is located in the central axial plane of the separator and passes through the center of the ball. The balls rotate between the rings of the bearing inside their respective pockets in the separator. The pocket for each ball has an internal pocket surface which is approximately adapted to the ball, around the pitch circle of the ball. The separator has an axial central plane and the pitch circle has opposite axial sides on both sides of the axial central plane of the separator. The axial central plane is perpendicular to the axis of the bearing.

The pocket surface includes first pocket surface sections that are at least approximately uncurved along the thickness dimension of the separator, that is, at least approximately, and perhaps exactly, cylindrical regions, which are spaced relatively near to, i.e. at a relatively smaller distance from the surface of the ball in the respective pocket. Measured around the pitch circle of the pocket around the ball, the cylindrical regions of the pocket surfaces are disposed between the pole and equator of the ball. In particular, the cylindrical first pocket surface sections, as seen in the cylinder plane determined by the pitch circle of the pocket surface around the ball, lie at an angle of between 30° to 60° away from the plane perpendicular to the axis of the bearing, which also is the central plane of the separator.

Adjoining the cylindrical first pocket surface sections, there are second pocket surface sections whose distance from the respective ball becomes progressively larger circumferentially around the pitch circle away from the first pocket surface sections. First ones of the second pocket surface sections extend above and past both poles of each ball.

The second pocket surface sections also include third pocket surface sections which extend above and past the equator of the ball at the opposite circumferential ends of each pocket. Because of the spacing of the second and third pocket surface sections from the ball, in each pocket, a crescent shaped slot is defined over the ball therein at the second and third pocket surface sections.

The separator is defined by two separator halves, each with half circle pocket recesses spaced along its length. The separator halves are positioned so that those recesses match up to define the row of circular pockets around the annular separator. The pocket surface of each pocket has a thickness dimension radially of the separator. The second and third pocket surface sections are each spherical surfaces located alongside the flatter zones which are formed at the cylindrical first pocket surface sections. With a given direction of rotation of the balls, the first pocket surface sections lie, as seen in the one half of the crescent-shaped sections, in the direction of ball movement, in front of the narrowest point in the region of the first pocket surface sections. The shaping of the various pocket surface sections forms a relatively long, narrowing slot leading to each first pocket surface section, and this results in optimal hydrodynamic lubricating conditions. The lubricating wedges are large enough that there can be no contact between the balls and the separator over the entire pocket surface even if larger forces occur. By eliminating that contact, the production of noise is then logically prevented and friction is substantially reduced since the hydrodynamic lubricating film does not permit physical contact. The balls as well as the separator are furthermore guided so that there is a reduction in the forces of imbalance and thus a reduction in the friction between the balls and the separator.

These conditions improve when the generally cylindrical first pocket surface sections lie in zones around the pitch circle which are favorable kinematically from the standpoint of lubricating technique. If this is done in accordance with the above described angular location of the first pocket surface sections around the pitch circle, then there is no contact of the balls in their pole regions, where relatively low relative velocity and thus unfavorable friction conditions are present. In particular, there are not frequent changes in direction of the relative velocities, and thus of the friction forces. An embodiment in accordance with FIG. 2 hereof is advantageous from the standpoint of manufacture since in this case, when the separator is made from two sheet metal halves secured together, the separator halves can be produced in simple fashion by deep drawing.

In the particular embodiment of the separator, the cylindrical first pocket surface sections of the pocket surface are adjoined by edge free second spherical pocket surface sections which pass over the pole regions of the ball. These second spherical sections which extend from the cylindrical first pocket surface sections above and past the pole regions of the ball have a smaller cylinder diameter than the diameter of the ball within the pockets, at least in the cylinder plane determined by the pitch circle of the respective pocket surface. As a result of the smaller diameter of the spherical second pocket surface sections, and their placement radially further outwardly spaced from the balls than the spacing therefrom of the cylindrical first pocket surface sections, the centers of the smaller diameter spherical second pocket surface sections are shifted outwardly along the pole diameter of the ball from the axial central plane of the separator, which is perpendicular to the axis of the bearing, and toward the corresponding spherical section of the pocket surface of the individual pocket.

Third pocket surface sections extend above and past the equator regions of the ball and past the axial central plane of the separator. They also are spherical pocket surface sections. The diameter of the third spherical pocket surface sections is greater than that of the balls, rather than being smaller, so that the centers of the third pocket surface sections are shifted from being located along the pole axis of the respective ball to being located beyond the pole axis and toward the opposite corresponding spherical third pocket surface section at the equator. More lubricant can be conveyed to the races in the equator region due to the free spaces available there if the pocket surfaces are in accordance with the foregoing arrangement.

Other objects and features of the invention are described with reference to the drawings.

DESCRIPTION OF A PREFERRED EMBODIMENT

Figure 1:
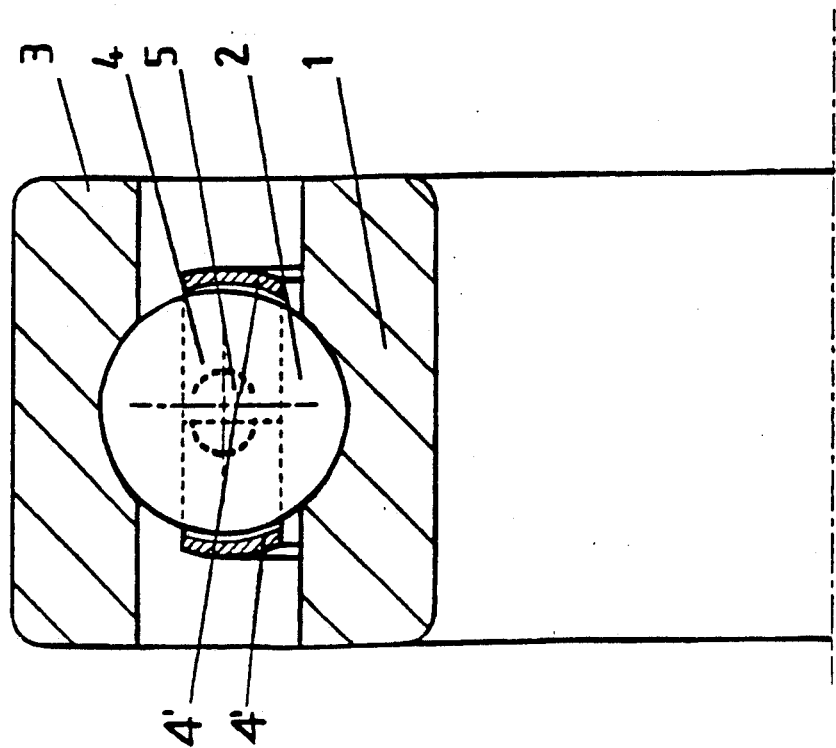
FIG. 1 is a partial cross-section through a ball bearing having a separator in accordance with the invention.

The ball bearing according to the invention, as shown in FIG. 1, is comprised of an inner ring 1, the balls 2, and the outer ring 3.

Figure 2:
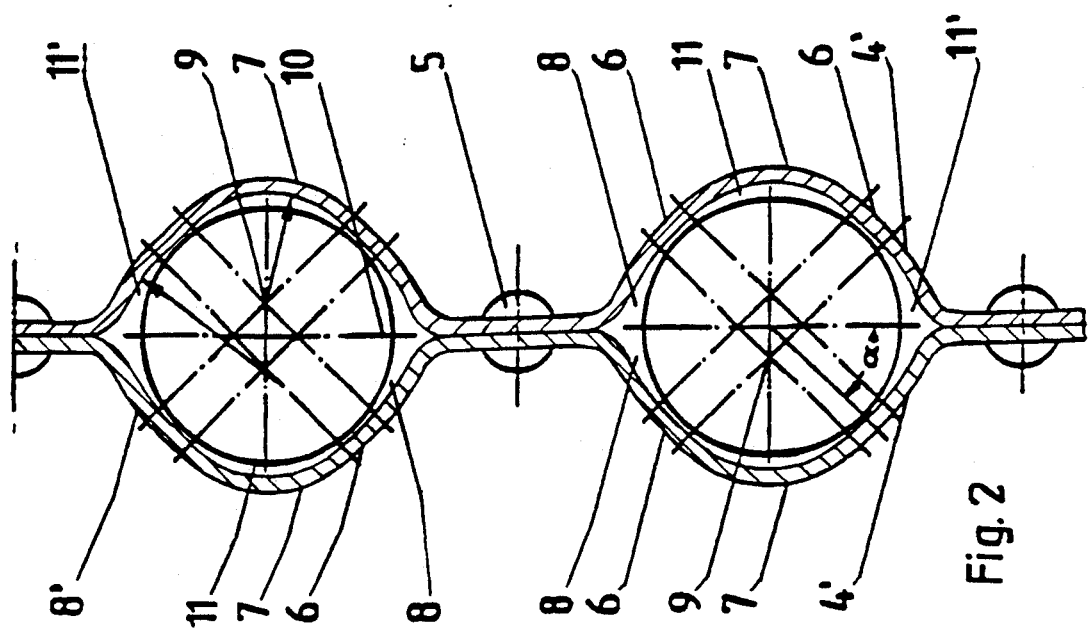
FIG. 2 is a section through several pockets of the separator of the invention shown in the developed pitch circle region.
Figure 3:
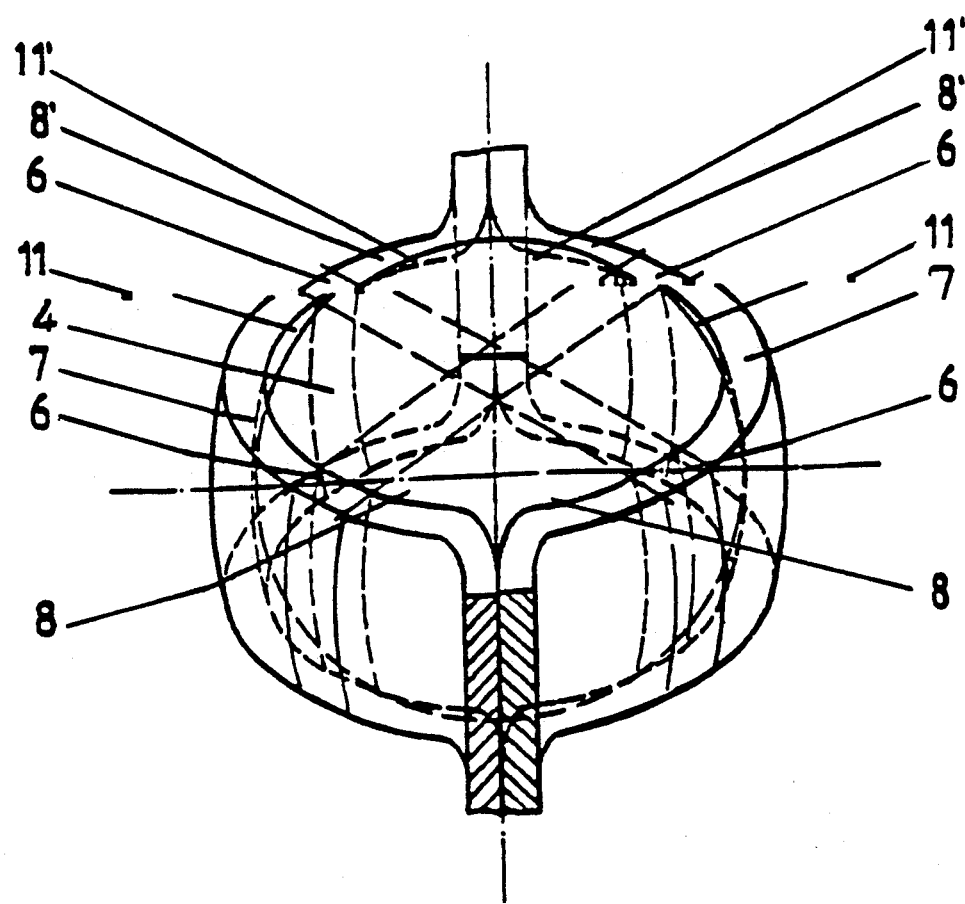
FIG. 3 shows a pocket according to FIG. 2, in perspective.

The balls 2 are held spaced apart in the annular gap between the rings by the separator or cage 4. As is known, the rings and the separator are all annular, and only part of the circumferential length of the entire annular separator is illustrated in FIG. 2. The separator 4 is comprised of two identical, annular sheet metal separator halves 4', which are held together by the rivets 5. Each separator half has a series of attached together substantially half circular pocket recesses defined in it. These complementary half pocket recesses are placed so that the generally semicircular half pocket recesses along the length of the separator halves are placed next to each other to together define the complete encircling pocket surfaces for the balls. The profile of the separator 4 can be noted from FIGS. 2 and 3.

The pocket surface in each separator half 4' has two first pocket surface sections 6 which are at least approximately uncurved around the plane of the pitch circle, that is uncurved along the thickness dimension of the separator. They are preferably essentially cylindrically curved around a radial axis through the center of the separator, but not curved around a plane defined by the pitch circle of the pocket surface. The size and placement of the two first pocket surface sections 6 is approximately adapted to and they are spaced relatively nearer to the spherical profile of the respective ball in the pocket.

Adjoining the first pocket surface sections 6 are spherically curved second pocket surface sections 7 which are free of edges. The sections 7 extend between the two sections 6 on the respective separator half 4' and therefore pass over and are spaced above the respective pole region of the ball 2, with respect to ball rotation. The second pocket surface sections 7 are spaced further from the surface of the ball 2 than are the first pocket surface sections 6 and the second pocket surface section widen gradually away from the surface of the ball, giving the slot between the ball and the section 7 a generally crescent shape. The spherical second pocket surface section 7 has a smaller diameter than the ball 2. The center point 9 of the second section 7 is shifted out of the axial central plane 10 of the separator, which is perpendicular to the axis of the bearing and the separator, toward that spherical section 7. This forms spherically curved, crescent shaped slots 11 between the balls and the pocket surface sections 7. The desired hydrodynamic conditions are optimally built up in the slots 11 so shaped. Since the slots 11 are also present in other planes outside the pitch circle plane of FIG. 2, there is practically friction free guidance of the balls 2 in the pockets since there is no metallic contact in the regions of the first pocket surface sections 6 where the slot width is smallest. In particular, all contact at the poles of the ball is avoided.

The same conditions are also achieved in the two lateral regions, defining third pocket surface sections 8, which are on the other sides of the first pocket surface sections from the slots 11 and which pass over and above the equator of the ball and are at the circumferential ends of the pockets. Part of each third pocket surface section 8 is defined on each of the separator halves 4' so that section 8 is bisected by the axial central plane of the separator. The inner curvature of the spherical third pocket surface sections 8 and 8' has a somewhat larger diameter than the balls 2 and those third sections are spaced further from the surface of the ball than the first pocket surface sections 6. Favorable hydrodynamic lubricating slots 11' are thus obtained here also.

The slots 11 and 11' are best distributed over the balls with regard to uniformly large lubricating wedges when the first pocket surface sections 6 are placed around the pitch circle of the pocket surface around the ball at an angle α of between 30° to 60° from the plane 10 through the bearing shaft and the axis of the separator, i.e. the axial central plane of the separator. There is no longer any friction between the pocket surfaces and the balls, in particular at the pole regions of the balls.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A separator for ball bearings, wherein the bearing includes balls, each ball having poles which define the axis about which the ball rotates and each ball having an equator perpendicular to the ball rotation axis and in a plane through the center of the ball;

the separator comprising:

a plurality of bearing ball pockets arrayed around the separator; each pocket being defined by a pocket surface which faces the ball within the pocket in a pitch circle around the ball, the pocket surface guiding the ball for enabling the ball to rotate in the pocket;

the separator having a thickness dimension in the radial direction of the bearing;

each pocket surface including: first pocket surface sections which are at least approximately uncurved along the thickness dimension of the separator and around an axis across the respective pitch circle, and the first pocket surface sections being spaced a relatively smaller distance from the surface of the ball in the pocket; and second pocket surface sections adjoining the first pocket surface sections, around the pitch circle of the pocket surface, at both sides of the first pocket surface sections, the second pocket surface sections being spaced a relatively larger distance from the surface of the ball in the pocket;

the distance of each second pocket surface section from the ball in the respective pocket becomes progressively larger gradually moving away from the adjoining first pocket surface section around the pocket surface.

2. The separator of claim 1, wherein at each axial side of the axial center of the separator, there are two of the first pocket surface sections.

3. The separator of claim 1, wherein the first pocket surface sections are at least approximately cylindrically curved, curving around an axis extending along the thickness dimension of the separator.

4. The separator of claim 3, wherein the first pocket surface sections are cylindrically curved in shape.

5. The separator of claim 1, wherein the separator has an axial center, and at least one of the first pocket surface sections being defined around the pitch circle of the pocket surface at each side of the axial center of the separator.

6. The separator of claim 5, wherein each pitch circle of each pocket is in a plane determined by the pitch circle, the bearing in which the separator is disposed has an axis and the first pocket surface sections are located around the pitch circle of the pocket at an angle of between 30° and 60° to a plane which is perpendicular to the axis of the bearing.

7. The separator of claim 6, wherein the separator comprises a pair of half separators, each comprising a plurality of half circular pocket recesses, the recesses being joined in a row thereof by respective joining elements between neighboring pocket recesses, and the half separators being connected together so that half pockets are disposed next to each other to define the plurality of pockets around the separator.

8. The separator of claim 7, wherein in each separator half at each axial side of the axial center of the separator, there are two of the first pocket surface sections each spaced at the said angle to the plane which is perpendicular to the axis of the bearing.

9. The separator of claim 1, wherein each pocket pitch circle is in a plane determined by the pitch circle, the bearing in which the separator is disposed has an axis and the first pocket sections are located around the pitch circle of the pocket at an angle of between 30° and 60° to a plane which is perpendicular to the axis of the bearing.

10. The separator of claim 1, wherein the second pocket surface sections, which adjoin the first pocket surface sections, are spherically curved, and the second pocket surface sections are positioned around the pocket surface as to extend over and past the poles of the ball in the pocket, the spherical second pocket surface sections each having a smaller diameter than the ball in the pocket, the spherical second pocket surface sections each having a center of curvature which is shifted from the axial center of the separator toward the respective corresponding second pocket surface section.

11. The separator of claim 10, wherein the second pocket surface sections also include third pocket surface sections which are also spherically curved, the third pocket surface sections extend over and past the equator of the ball in the pocket, and the third pocket surface sections each having a greater diameter than the ball in the pocket.

12. The separator of claim 11, wherein at each axial side of the axial center of the separator, there are two of the first pocket surface sections.

13. The separator of claim 12, wherein there is a respective second pocket surface section between each of the two first pocket surface sections on a respective axial side of the separator and there is a respective third pocket surface section between one first pocket surface section on one side of the axial center of the separator and one first pocket surface section on the other side of the axial center of the separator.

14. The separator of claim 12, wherein each pocket pitch circle is in a plane determined by the pitch circle, the bearing in which the separator is disposed has an axis and the first pocket sections are located around the pitch circle of the pocket at an angle of between 30° and 60° to a plane which is perpendicular to the axis of the bearing, and each first pocket surface section is spaced at the said angle to the plane which is perpendicular to the axis of the bearing.

15. The separator of claim 14, wherein at each axial side of the axial center of the separator, there are two of the first pocket surface sections each first pocket surface section is spaced at the said angle to the plane which is perpendicular to the axis of the bearing.

16. The separator of claim 1, wherein the second pocket surface sections are spherically curved and extend over and past the equator of the ball in the pocket, the diameter of the second pocket surface sections is greater than the diameter of the ball in the pocket.

17. The separator of claim 1, wherein the separator comprises a pair of half separators, each comprising a plurality of half circular pocket recesses, the recesses being joined in a row thereof by respective joining elements between neighboring pocket recesses, and the half separators being connected together so that half pockets are disposed next to each other to define the plurality of pockets around the separator.

* * * * *